United States Patent
West (10) Patent No.: US 9,248,921 B2
(45) Date of Patent: Feb. 2, 2016

(54) METHOD FOR MOUNTING A PYLON TO AN AIRCRAFT

(71) Applicant: Spirit AeroSystems, Inc., Wichita, KS (US)

(72) Inventor: Randall Ray West, Wichita, KS (US)

(73) Assignee: Spirit AeroSystems, Inc., Wichita, KS (US)

(*) Notice: Subject to any disclaimer, the term of this patent is extended or adjusted under 35 U.S.C. 154(b) by 560 days.

(21) Appl. No.: 13/939,526

(22) Filed: Jul. 11, 2013

(65) Prior Publication Data
US 2015/0013142 A1  Jan. 15, 2015

(51) Int. Cl.
*B64D 27/26* (2006.01)
*B23P 15/00* (2006.01)
*B64F 5/00* (2006.01)
*B64D 27/18* (2006.01)

(52) U.S. Cl.
CPC .............. *B64F 5/0009* (2013.01); *B64D 27/18* (2013.01); *B64D 27/26* (2013.01); *B64D 2027/262* (2013.01); *Y10T 29/49826* (2015.01); *Y10T 29/49893* (2015.01); *Y10T 29/49947* (2015.01); *Y10T 29/49948* (2015.01); *Y10T 29/49959* (2015.01); *Y10T 29/49963* (2015.01)

(58) Field of Classification Search
CPC ................. Y10T 29/49948; Y10T 29/49963; Y10T 29/49893; B64D 27/12; B64D 27/18; B64D 2027/262; B64D 2027/264; B64D 2027/266; B64D 2027/268; B64D 27/26
See application file for complete search history.

(56) References Cited

U.S. PATENT DOCUMENTS

| | | | |
|---|---|---|---|
| 5,452,575 A * | 9/1995 | Freid | 60/797 |
| 7,963,479 B2 | 6/2011 | Cazals | |
| 2008/0217502 A1* | 9/2008 | Lafont | 248/554 |
| 2009/0212155 A1* | 8/2009 | Huggins et al. | 244/54 |
| 2011/0121132 A1* | 5/2011 | Crook et al. | 244/54 |
| 2012/0056033 A1 | 3/2012 | Teulou et al. | |
| 2012/0198815 A1* | 8/2012 | Suciu et al. | 60/226.3 |
| 2012/0305700 A1* | 12/2012 | Stuart et al. | 244/54 |

FOREIGN PATENT DOCUMENTS

| | | |
|---|---|---|
| FR | 2878229 | 11/2004 |
| FR | 2909973 | 12/2006 |
| FR | 2964364 | 9/2010 |

* cited by examiner

*Primary Examiner* — Jermie Cozart
(74) *Attorney, Agent, or Firm* — Hovey Williams LLP

(57) ABSTRACT

An assembly and method for attaching an engine pylon to an aircraft wing. The method may include attaching a first forward wing-mounted fitting to the pylon at a first side of the pylon between upper and lower spars of the pylon and attaching a second forward wing-mounted fitting to the pylon at a second side of the pylon between the upper and lower spars of the pylon. The second side of the pylon is located opposite of the first side of the pylon. Mechanical attachment devices may be inserted through holes on the sides of the pylon aligned with holes formed through the forward wing-mounted fittings. The mechanical attachment devices may be made of steel and the forward wing-mounted fittings may be made of composite or aluminum material.

20 Claims, 12 Drawing Sheets

METHOD FOR MOUNTING A PYLON TO AN AIRCRAFT

BACKGROUND

Aircraft engines are typically supported below aircraft wings by structural elements called "pylons." Such pylons are subjected to substantial forces and therefore must be securely mounted to their associated wings and engines.

Prior art methods of mounting an engine pylon to an aircraft wing include using various mechanical attachments to attach a top surface or a top spar of the pylon to the wing. The mechanical attachment is generally made of high strength steel to handle the engine thrust loads or rather may require larger joints having more material.

In designing a pylon and determining how to best mount the engine nacelle and pylon to the wing, several factors must be considered, including engine/nacelle placement with respect to the wing (which may make longer pylons desirable), reducing the height of the supporting structure or pylon, and increasing loads at the pylon/wing attachment location. To maintain the necessary vertical stiffness of the joint between the nacelle and the wing while accounting for each of these design considerations, larger joints with more material or higher strength materials are generally used to attach the pylon to the wing and/or the nacelle to the wing, sometimes sacrificing durability of the joint. Larger joints attaching the top surface or top spar of the pylon to the wing may undesirably increase the space between the wing and pylon.

SUMMARY

Embodiments of the present invention solve the above-mentioned problems and provide a distinct advance in the art of mounting aircraft engines to aircraft wings.

Some embodiments of the invention provide a method of attaching an engine pylon to an aircraft wing by attaching first and second forward wing-mounted fittings to a pylon at first and second sides of the pylon between upper and lower spars of the pylon. The second side of the pylon may be located opposite of the first side of the pylon. Specifically, a support bulkhead located between the upper and lower spars of the pylon may have bores formed therein which may be aligned with side attachment holes formed through the first and second forward wing-mounted fittings. Mechanical attachments such as pins, bolts, disks, pucks, lug fittings, bosses, trunnions, support beams, and caps may be used to form a joint between the forward wing-mounted fittings and the pylon at the axially-aligned bores and side attachment holes. Other various attachment devices may provide additional fail-safe load paths between the pylon and the wing, including center wing-mounted fittings located between the first and second forward wing-mounted fittings, a rear attachment located afterward of the first and second forward wing-mounted fittings, and/or braces connecting the pylon and the wing.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiment 1

In a first embodiment of the invention, a method of mounting an engine pylon 12 to a wing 14 of an aircraft may make use of a pylon mounting system 10 as illustrated in FIGS. 1-4. The pylon 12 may support an aircraft engine 16 and/or an engine nacelle, thereby providing the necessary structural load paths and required positioning between the engine 16 and the wing 14. The pylon mounting system 10 may comprise a rear attachment 18 and a forward attachment 20, as well as additional braces and/or structural supports, as described below.

Figure 2:
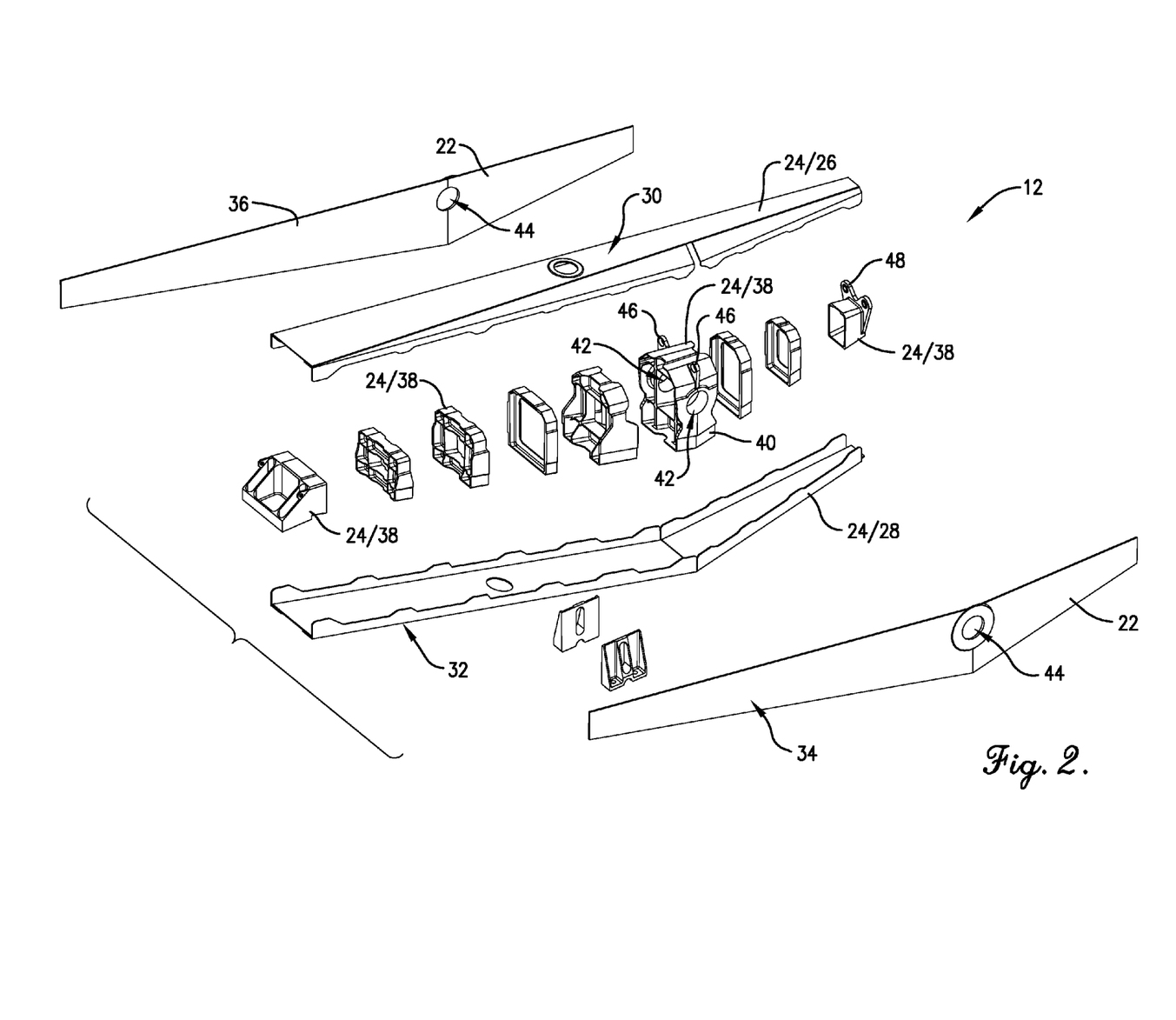
FIG. 2 is an exploded perspective view of the engine pylon of FIG. 1 configured for attachment to the wing via the pylon mounting system of FIG. 1.

As illustrated in FIG. 2, the pylon 12 may comprise pylon skin 22, such as composite skin, and frame components 24 to which the pylon skin 22 is formed around and attached to. The frame components 24 may include an upper spar 26 and a lower spar 28. The upper spar 26 may be positioned vertically higher than the lower spar 28. In most embodiments of the invention, the upper spar 26 is positioned closer to the wing 14 than the lower spar 28 and the lower spar 28 is positioned closer to the engine 16 than the upper spar 26. However, in some alternative embodiments of the invention where the engine 16 is positioned above the wing 14, the upper spar 26 may be located closer to the engine 16 than the lower spar 28. The pylon 12 may have a top side 30, a bottom side 32 opposite of the top side 30, a first side 34, and a second side 36 opposite of the first side 34 and extending between the top side 30 and the bottom side 32. The various sides of the pylon 12 may include portions of the skin 22 and the frame components 24 of the pylon 12.

In some embodiments of the invention, the frame components 24 may additionally comprise various internal structural supports 38 located between the upper and lower spars and spaced apart from each other length-wise along the pylon 12. Specifically, the internal structural supports may comprise a support bulkhead 40 having bores 42 formed therethrough, through the first and second sides 34,36 of the pylon 12 between the upper and lower spars 26,28. For example, the bores 42 may be aligned with each other along an axis extending through a width of the pylon 12. Likewise, pylon side holes 44 may be formed through sides of the pylon skin 22 in alignment with the bores 42 of the support bulkhead 40.

Furthermore, the pylon 12 may have one or more protrusions or attachment plates 46,48 integrally formed therewith or attached thereto and protruding outward and/or upward from the frame components 24 and/or the skin 22 of the pylon 12. The attachment plates 46,48 may include forward pylon attachment plates 46 and a rear pylon attachment plate 48, each of which may have attachment holes formed therethrough, as illustrated in FIG. 2. The attachment holes may be configured for mechanical fasteners to extend therethrough for attaching the attachment plates 46,48 of the pylon 12 with the rear attachment 18 or the forward attachment 20, as described below. The pylon 12 may also comprise various components configured for attaching the pylon 12 to the aircraft engine 16 and/or engine nacelle, such as those known in the prior art.

Figure 1:
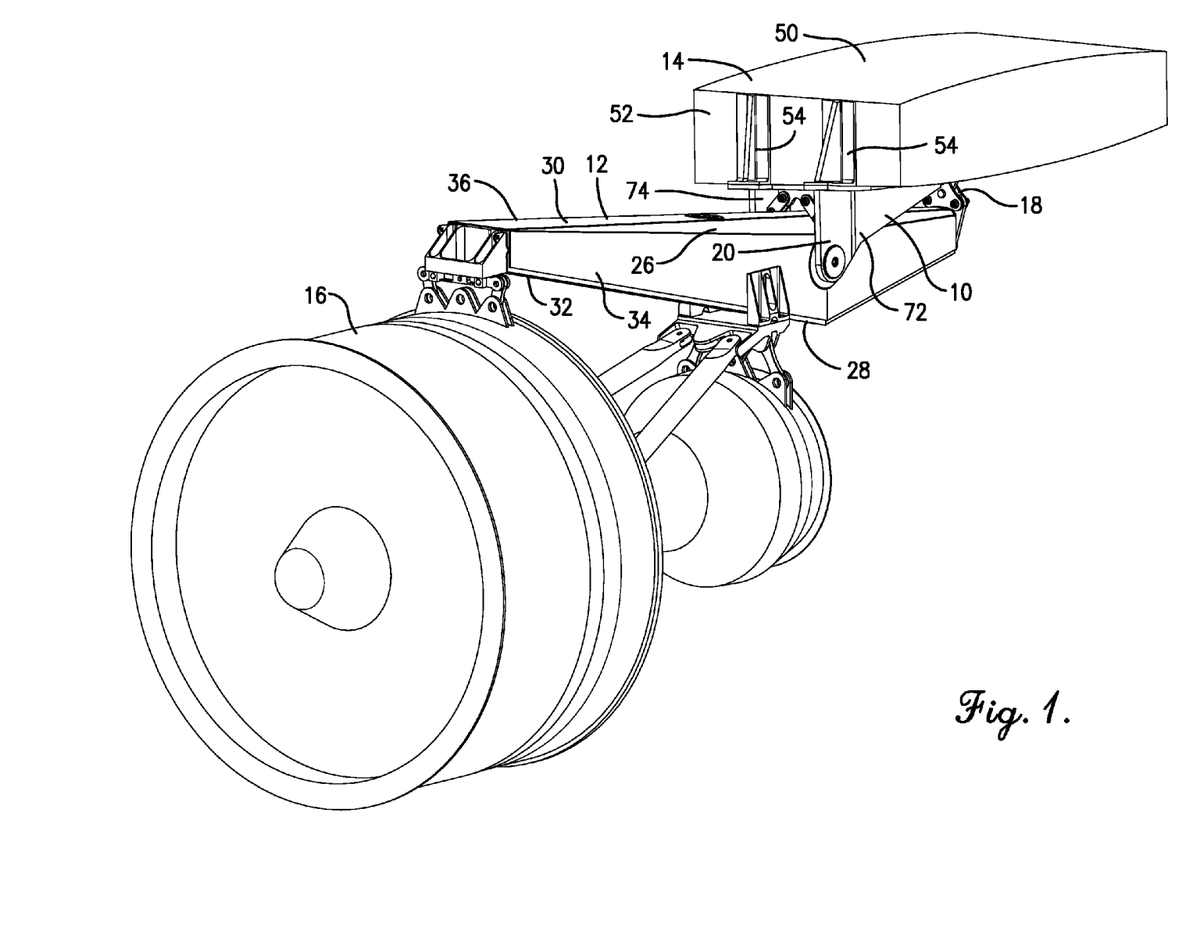
FIG. 1 is a perspective view of an engine pylon mounted to a wing via a pylon mounting system constructed in accordance with a first embodiment of the present invention.

The wing 14 may be any aircraft wing with a wing skin 50 and various wing frame components, as illustrated in FIG. 1. The wing skin 50 may be mechanically fixed and/or integrally formed with the wing frame components. The wing frame components may include at least one wing front spar 52 and any number of additional spars, as well as wing ribs and other structural supports. Wing fittings 54 may be mounted to the wing front spar 52, such that various elements of the forward attachment 20 may attach to the wing fittings 54. Alternatively, the wing fittings 54 may be a part of the forward attachment 20 and/or the forward attachment 20 may be mounted directly to the wing front spar 52. The aircraft engine 16 and/or the aircraft nacelle may be any aircraft engine and nacelle known in the art and attachable to an aircraft wing via the pylon 12.

Figure 3:
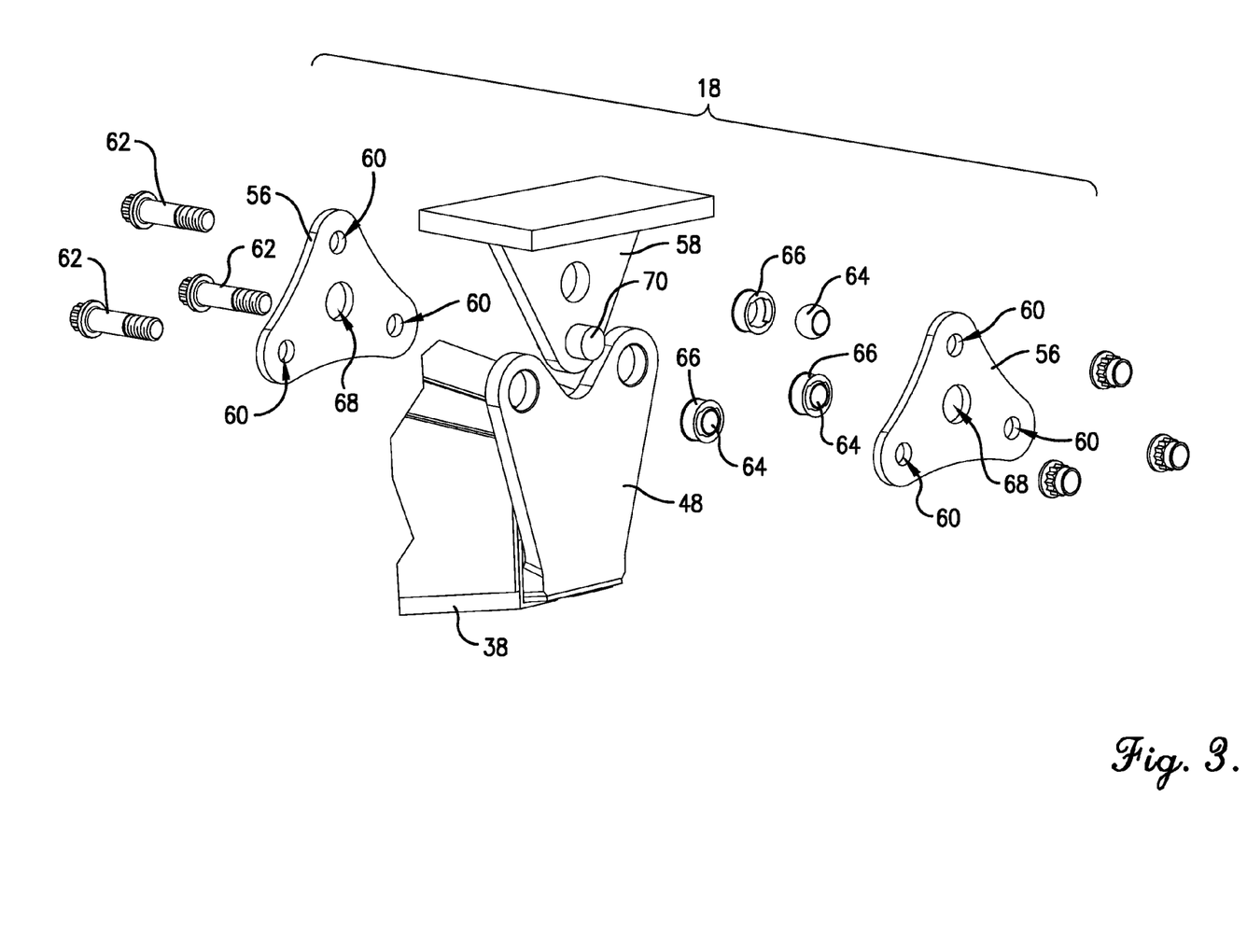
FIG. 3 is an exploded perspective view of a rear attachment of the pylon mounting system of FIG. 1.

The rear attachment 18, as illustrated in FIG. 3, may be any one or more components configured to cooperatively attach a rear portion or end of the pylon 12 to the wing 14. For example, the rear attachment 14 may comprise rear linking attachment plates 56 and a rear wing-mounted fitting 58 configured to be mechanically attached to the rear pylon attachment plate 48. The rear wing-mounted fitting 58 may be attached to or integrally formed with one of the spars of the wing 14, such as another spar, a wing rib, or another of the wing frame components located rearward of the wing front spar 52.

The rear linking attachment plates 56 may have a plurality of attachment holes 60 formed therein and configured to align with attachment holes of the pylon 12 or the rear pylon attachment plate 48 and the rear wing-mounted fitting 58. For example, as illustrated in FIG. 3, each of the rear linking attachment plates 56 may have three attachment holes 60 configured to be aligned with each other when the rear linking attachment plates 56 are placed on opposing sides of the rear wing-mounted fitting 58 and the rear pylon attachment plate 48. Two of the holes may align with corresponding holes of the rear pylon attachment plate 48 and one of the holes may align with a corresponding hole of the rear wing-mounted fitting 58. Any mechanical fasteners 62 may be inserted through these aligned holes to connect the rear pylon attachment plate 48 with the rear wing-mounted fitting 58. For example, pins, screws, or bolts may be inserted therethrough. Spherical bearings and/or lugs may also be used. For example, a spherical bearing may comprise a mono-ball 64 inserted into a bearing race 66, as illustrated in FIG. 3. The bearing race 66 may have at least one side swaged, forming a retaining lip for retaining the spherical bearing in holes of the rear attachment 18. The spherical bearings may be inserted into the holes of the rear pylon attachment plate 48 and/or the rear wing-mounted fitting 58 to allow flexure of the pylon 12 as it bends under applied loads and to provide a non-rigid attachment that allows the pylon 12 to grow in length during thermal expansion.

Furthermore, the rear linking attachment plates 56 may each have a failsafe catcher opening 68 formed therethrough and the rear wing-mounted fitting 58 may comprise a failsafe catcher pin 70 integrally formed therewith and protruding aftward therefrom. The failsafe catcher pin 70 may be configured to slide into the failsafe catcher opening 68, thus aligning the attachment holes 60 of the linking attachment plates 56 with holes of the rear wing-mounted fitting 48 and holes of the rear pylon attachment plate 58. The failsafe catcher pin 70 and the failsafe catcher opening 68 may provide an additional failsafe load path in case one of the other load paths of the pylon mounting system 10 fails.

The forward attachment 20 may include forward wing-mounted fittings 72,74,76 and corresponding mechanical attachment components 77,79 configured for attaching the pylon 12 to the forward wing-mounted fittings 72-76. The forward attachment 20 may also include various other structural supports and attachment links, such as center linking attachment plates 78 and spherical bearings 80. The forward wing-mounted fittings 72-76 may include a first forward wing-mounted fitting 72 configured to attach to the pylon 12 at the first side 34 of the pylon 12, a second forward wing-mounted fitting 74 configured to attach to the pylon 12 at the second side 36 of the pylon 12, and a center wing-mounted fitting 76 located between the first and second forward wing-mounted fittings 72,74 and configured to attach to the top side 30 and/or the first and second sides 34,36 of the pylon via mechanical attachment to the forward pylon attachment plates 46 or various other portions of the pylon's frame components 24.

Figure 4:
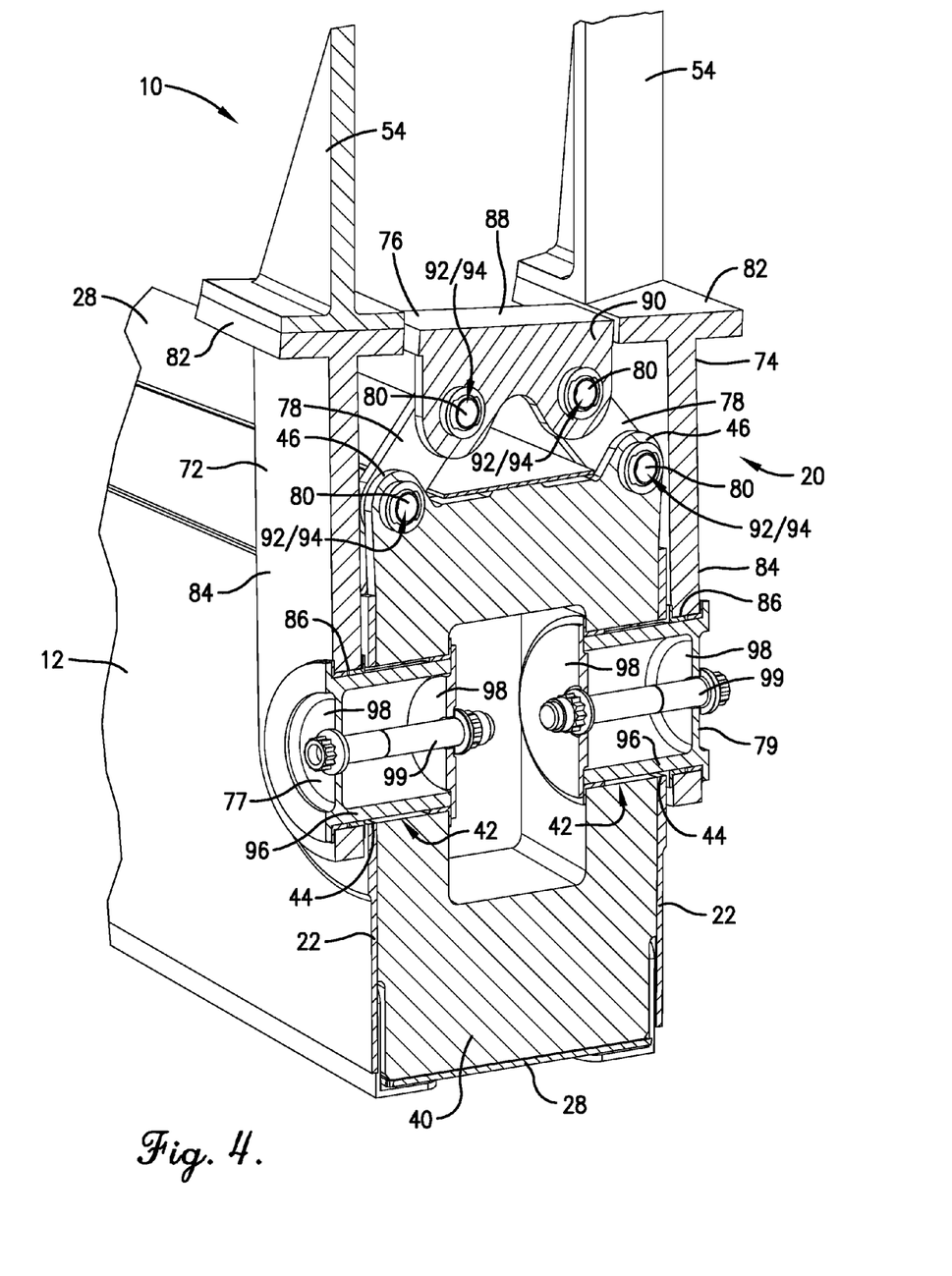
FIG. 4 is a cross-sectional perspective view of a forward attachment of the pylon mounting system of FIG. 1.

As illustrated in FIG. 1, the first and second forward wing-mounted fittings 72,74 may be mechanically attached, integrally formed, or otherwise mounted to the wing front spar 52 or another of the wing frame components via the wing fittings 54. As illustrated in FIG. 4, the first and second forward wing-mounted fittings 72,74 may comprise wing-mounting flanges 82 and pylon-mounting flanges 84. For example, the pylon-mounting flanges 84 may extend at a substantially right angle from the wing-mounted flanges 82. The wing-mounting flanges 82 may attach to the wing fittings 54 and/or to other fittings or various structural components of the wing 14. For example, in some embodiments of the invention, the wing-mounting flanges 82 may attach to internal wing structure such as wing ribs along a bottom side of the wing. Side attachment holes 86 may be formed into and through each of the pylon-mounting flanges 84 and may be configured to align with the bores 42 and pylon side holes 44 of the pylon 12.

In some embodiments of the invention, the pylon-mounting flanges 84 may each have a nearly-triangular shape, as illustrated in FIG. 1, with a first edge formed at the wing-mounting flange 82, a second edge perpendicular to and extending substantially downward from the wing-mounting flange 82, and a third edge or hypotenuse extending between the first and second edges. The side attachment holes 86 may be located at or proximate to a corner of the pylon-mounting flanges formed by the second and third edges thereof.

The center wing-mounted fitting 76 may comprise a center mounting plate 88 configured to be integrated with or mechanically attached to the wing 14 and/or the front spar of the wing 14. Furthermore, the center wing-mounted fitting 76 may comprise one or more center attachment tabs 90 extending from the center mounting plate 88 and integrally formed of one-piece construction with the center mounting plate 88. The center attachment tabs 90 may have center attachment tab holes 92 formed therethrough. The center wing-mounted fitting 76 may be mechanically attached to the pylon 12 by way of the center linking attachment plates 78. Specifically, the center linking attachment plates 78 may have center linking attachment plate holes 94 formed therethrough. For example, there may be a first pair of center linking attachment plates 78 configured to sandwich a first one of the center attachment tabs 90 and a first one of the forward pylon attachment plates 46 therebetween and a second pair of center linking attachment plates 78 configured to sandwich a second one of the center attachment tabs 90 and a second one of the forward pylon attachment plates 46 therebetween. Note that the cross-sectional view of the forward attachment 20 in FIG. 4 shows only one of each center linking tab attachment plates 78 per pair described above.

The center linking attachment plate holes 94 may be positioned proximate to opposing ends of the center linking attachment plates 78 and may be configured for aligning with attachment holes of the forward pylon attachment plates 46 at one end and aligning with center attachment tab holes 92 at the other end thereof. Any mechanical fasteners, such as spherical bearings, pins, screws, and the like may be inserted through the aligned holes of the center linking attachment plates 78, forward pylon attachment plates 46, and center attachment tabs 90 to mechanically link these plates, thus attaching the center wing-mounted fitting 76 to the pylon 12. For example, the spherical bearings 80 may be used at each of the center linking attachment plate holes 94 to allow flexure of the pylon 12 without imparting undo lug bending force into the pylon 12. The center linking attachment plates 78 may angle toward each other at ends thereof mechanically attached to the center wing-mounted fitting 76.

The mechanical attachment components 77,79 of the forward attachment 20 may be any device for mechanically attaching the first and second wing-mounted fittings 72,74 to the first and second sides 34,36 of the pylon 12. A first mechanical attachment component 77 may attach the first forward wing-mounted fitting 72 to the first side 34 of the pylon 12 and a second mechanical attachment component 79 may attach the second wing-mounted fitting 74 to the second side 36 of the pylon 12. Specifically, the mechanical attachment components 77,79 may be configured for insertion through the side attachment holes 86 of the pylon-mounting flanges 84, through the pylon side holes 44, and through the bores 42 of the pylon's support bulkhead 40.

The side attachment positioning of the first and second wing-mounted fittings 72,74 to the pylon 12 allows for the use of mechanical attachment components having an increased diameter cylindrical interface. For example, the diameter of the mechanical attachment components 77,79 may be approximately 4 inches to 10 inches in diameter. More specifically, the diameter of the mechanical attachment components 77,79 may be approximately 5 inches to 8 inches in diameter. This increased area of this bearing surface allows use of materials at this joint and surrounding structure which were unsuitable to prior art attachments, such as composite or aluminum. Therefore, in some embodiments of the invention, the forward wing-mounted fittings 72,74,76 may be made of composite, aluminum, combinations thereof, and the like, and the mechanical attachment components 77,79 may be made of stainless steel with various wear-resistant coatings or other such materials having similar strength and load-bearing capabilities.

The mechanical attachment components 77,79 may specifically include a pin, boss, bolt, disk, puck, lug fitting, trunnion, support beam, cap, or the like. Furthermore, a wear-resistant bushing may be used between the pylon 12 and the mechanical attachment components 77,79 inserted through the side attachment holes 86 of the pylon-mounting flanges 84.

For example, as illustrated in FIG. 4, the mechanical attachment components 77,79 may comprise pins 96 inserted into the side attachment holes 86 of the pylon-mounting flanges 84, engaging the bores 42 of the pylon's support bulkhead 40. The bores 42 may be located within the pylon 12 and aligned with the pylon side holes 44 formed through the pylon skin 22. The pins 96 may each take the form of a hollow cylindrical pin, having a first end and a second end opposite of the first end. The pins 96 may be open on both ends and may have end caps 98 placed at either end thereof, each held in place by bolts 99 passing through centers of the pins 96. In some example embodiments of the invention, each of the pins 96 may have one of the caps 98 integrally formed thereto and another one of the caps 98 mechanically attached thereto and retained against the pin by one of the bolts 99 extending therethrough. The pins 96 and/or the caps 98 may comprise flanges or retention protrusions integrally formed therewith and configured to engage various surfaces of the support bulkhead 40, the pylon skin 22, and/or the first and second forward wing-mounted fittings 72,74. The pins 96 may also be integrally stiffened with internal members to increase their rigidity and resistance to distortion.

The first and second wing-mounted fittings 72,74 and their corresponding mechanical attachment components 77,79, as well as the rear attachment 18, may contribute to a reaction of side loads (e.g., moment about a Z-axis or vertical axis) as well as vertical or pitching loads applied to the pylon 12. The center linking attachment plates 78 and the center wing-mounted fitting 76 act to resist side displacement along an axis extending through the side attachment holes 86 and/or their corresponding mechanical attachment components 77,79 and also provide an alternate vertical load path for failure of the mechanical attachment components 77,79 and/ or the first or second wing-mounted fittings 72,74.

Embodiment 2

Figure 5:
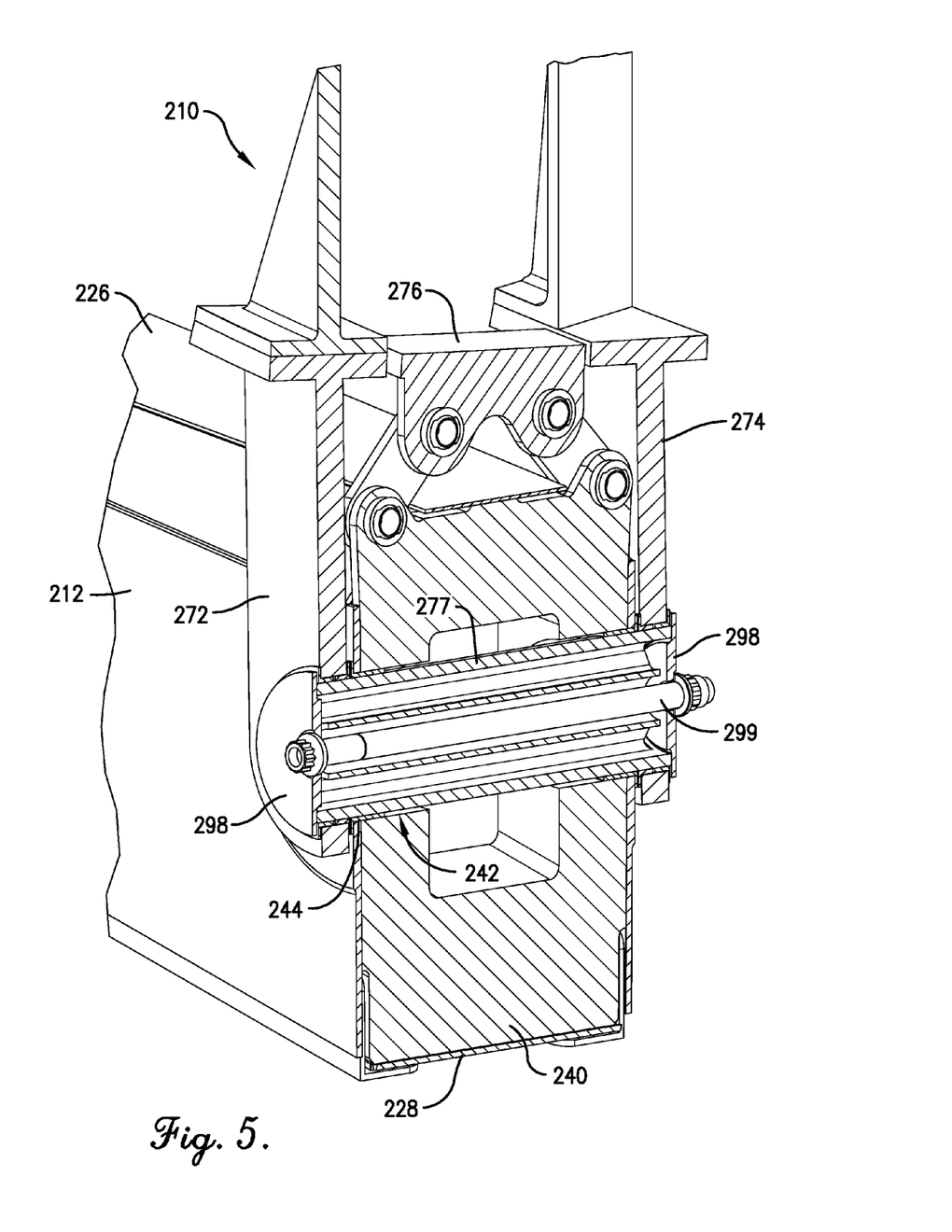
FIG. 5 is a cross-sectional perspective view of a forward attachment of a pylon mounting system constructed in accordance with a second embodiment of the present invention, including a bolt and a stiffening beam extending through a width of the pylon and securing elements of the forward attachment to the pylon.
Figure 6:
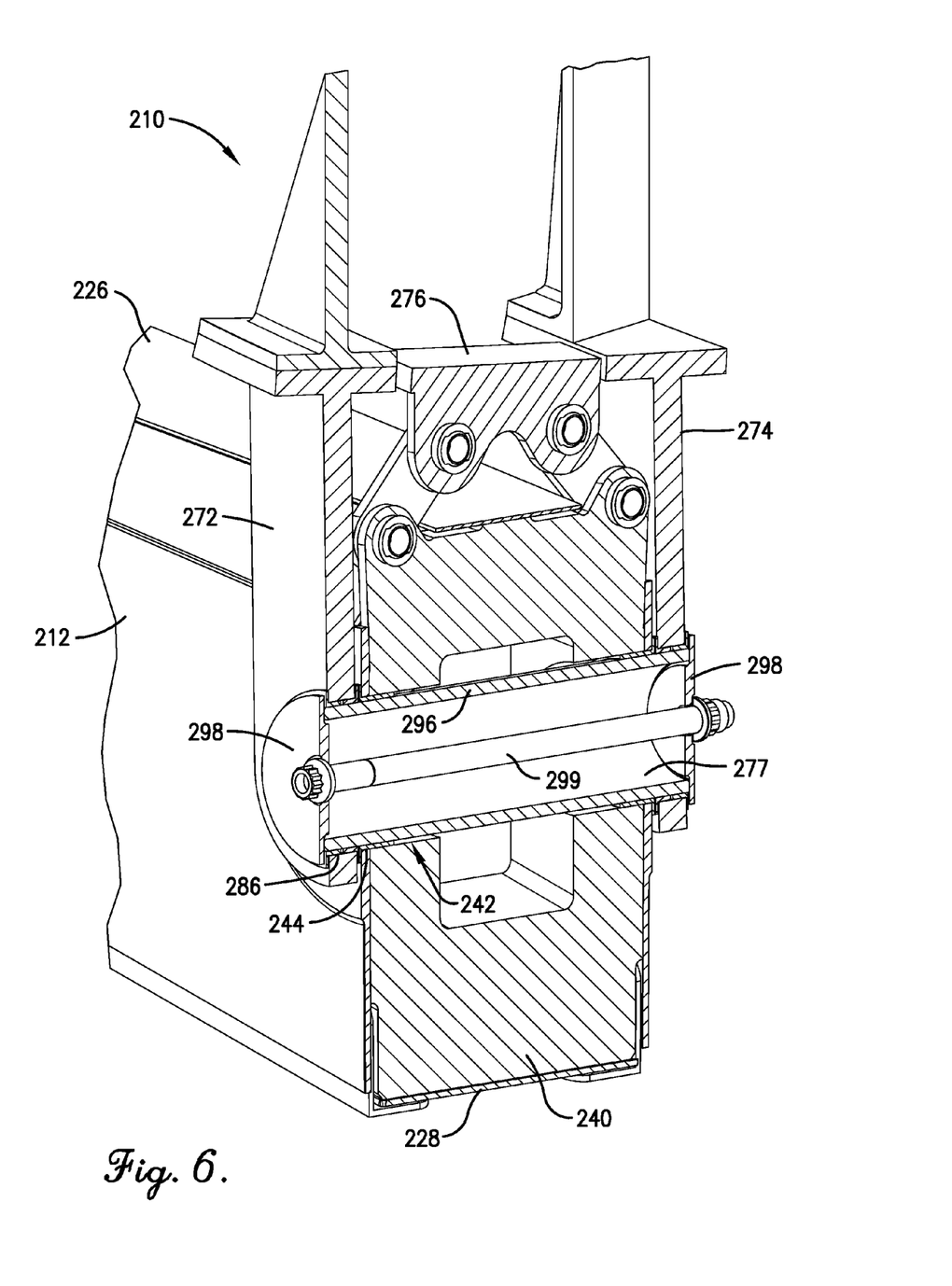
FIG. 6 is a cross-sectional perspective view of the forward attachment of FIG. 5 with an alternative hollow beam configuration.

In a second embodiment of the invention, a method of mounting an engine pylon 212 to a wing (not shown) of an aircraft may make use of a pylon mounting system 210, as illustrated in FIGS. 5 and 6. The pylon mounting system 210 may primarily comprise each of the elements of the pylon mounting system 10 described in the first embodiment of the invention. For example, pylon 212 may be substantially identical to pylon 12, comprising a support bulkhead 240 and corresponding bores 242 formed therethrough, substantially identical to the support bulkhead 40 and bores 42, as well as pylon side holes 244 which may be substantially identical to the pylon side holes 44. Likewise, the pylon mounting system 210 may comprise forward wing-mounted fittings 272,274, 276 substantially identical to the forward wing-mounted fittings 72,74,76 of the first embodiment of the invention, including side attachment holes 286 substantially identical to the side attachment holes 86 of the first embodiment of the invention. The attachment of the first and second forward wing-mounted fittings 272,274 may be located between upper and lower spars 226,228 of the pylon 212.

However, in the second embodiment of the invention, the mechanical attachment components 77,79 may be replaced with a single mechanical attachment component 277 which may extend entirely through a width of the pylon 212. Specifically, the mechanical attachment component 277 may be a cylindrical pin 296 which may pass through the support bulkhead 240 and pylon side holes 244 and may be used to attach the pylon 212 to the first and second forward wing-mounted fittings 272,274, as illustrated in FIGS. 5 and 6. For example, FIG. 5 illustrates an integrally-stiffened cylindrical pin or beam, while FIG. 6 illustrates the cylindrical pin 296 as a hollow cylindrical pin or beam, similar to the pins 96 in the first embodiment of the invention. The cylindrical pin 296 may be integrally-formed with the support bulkhead 240 and/ or mechanically attached thereto. For example, caps 298, similar or identical to the caps 98 of the first embodiment of the invention, may retain the cylindrical pin 296 within the support bulkhead 240 via a bolt 299. The bolt 299 may extend entirely through the pylon 212, with fasteners on opposing ends thereof securing the caps 298 and the single cylindrical pin 296 to the pylon 212.

Embodiment 3

Figure 7:
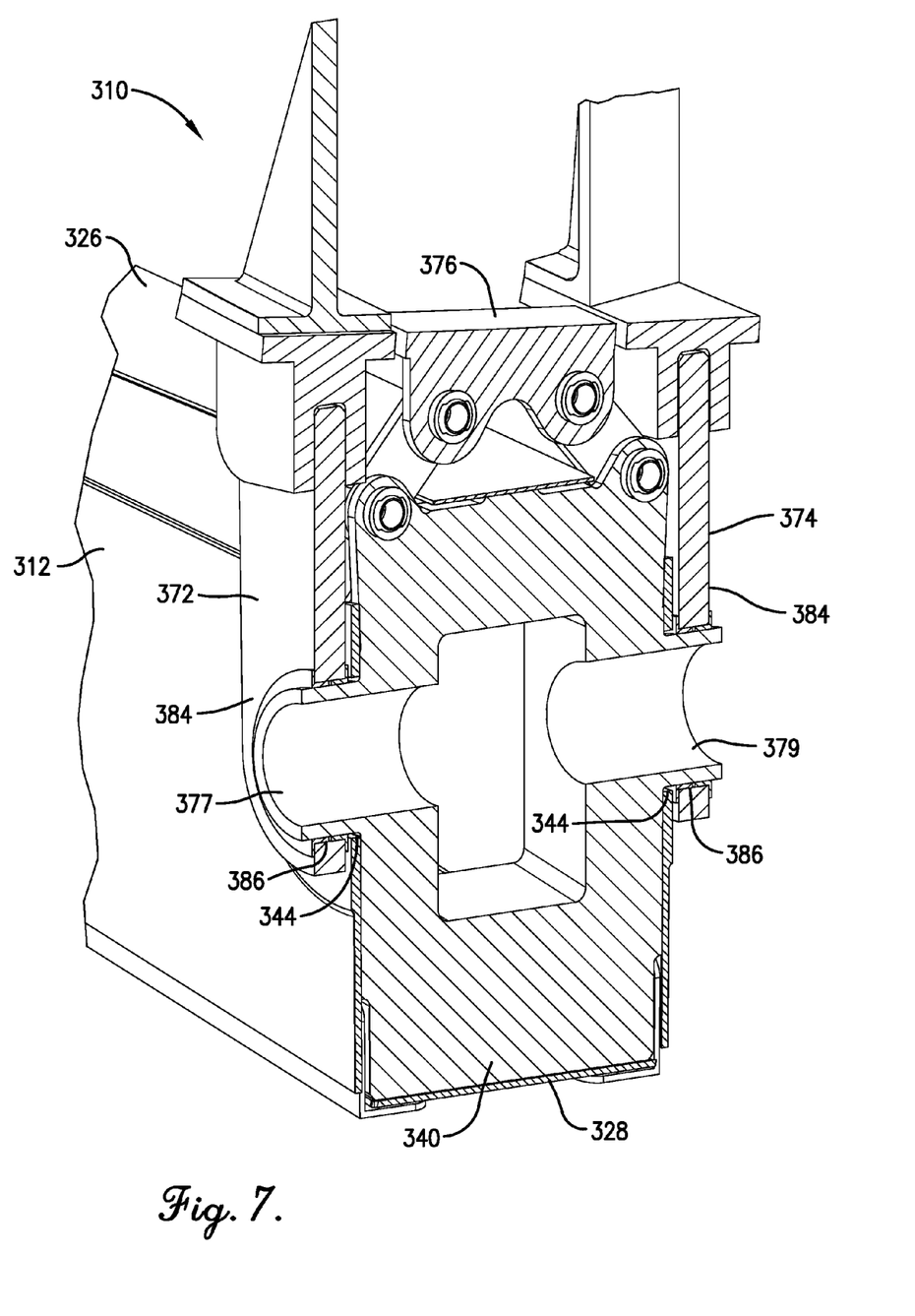
FIG. 7 is a cross-sectional perspective view of a forward attachment of a pylon mounting system constructed in accordance with a third embodiment of the present invention, illustrating trunnions extending from the pylon for attaching the forward attachment to the pylon.
Figure 8:
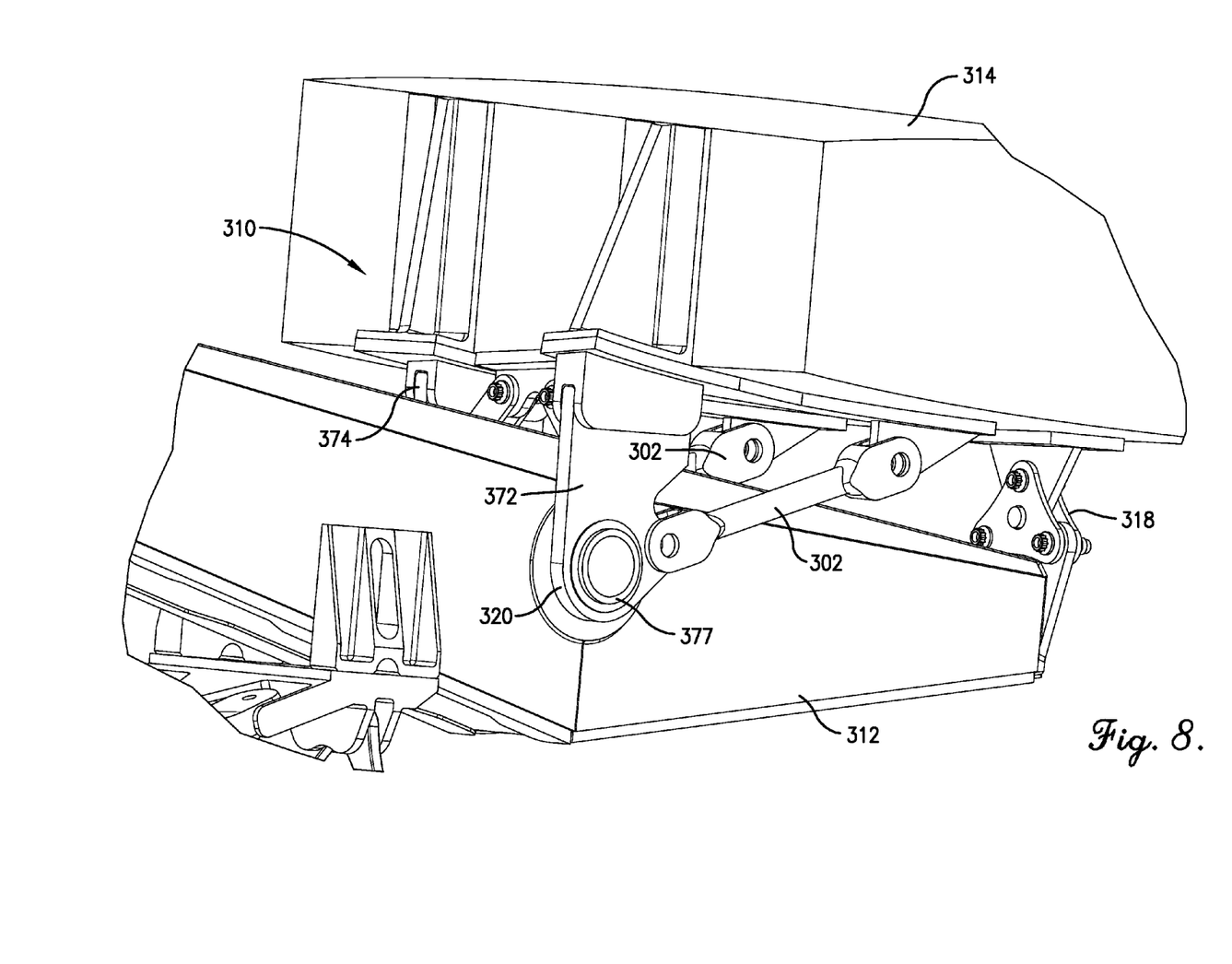
FIG. 8 is a perspective view of the pylon mounting system of FIG. 7, further illustrating drag braces extending between the pylon and a wing.
Figure 9:
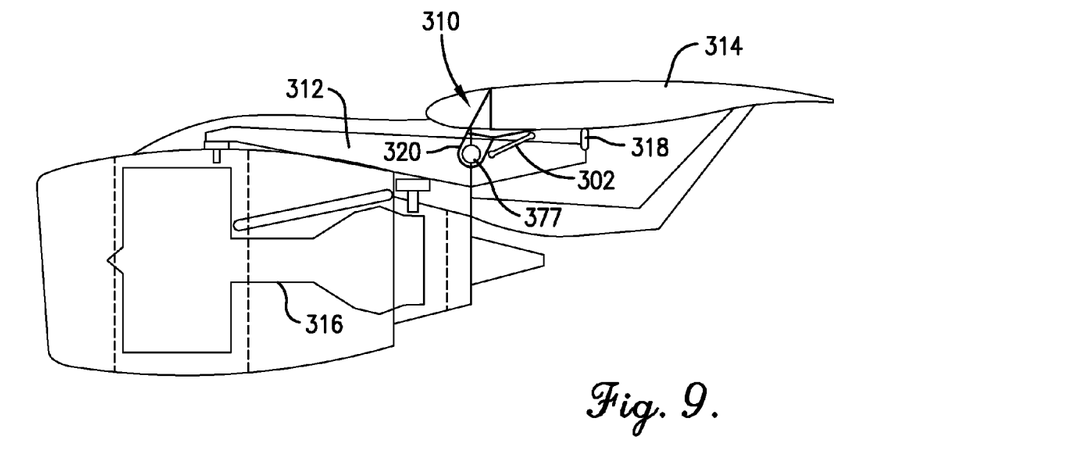
FIG. 9 is a schematic side elevation view of the pylon mounting system of FIG. 7.

In a third example embodiment of the invention, a method of mounting an engine pylon 312 to a wing 314 of an aircraft may make use of a pylon mounting system 310, as illustrated in FIGS. 7-9. The pylon mounting system 310 may primarily comprise each of the elements of the pylon mounting system 10 described in the first embodiment of the invention. For example, pylon 312 may be substantially identical to pylon 12, comprising a support bulkhead 340 substantially identical to the support bulkhead 40 and pylon side holes 344 which may be substantially identical to the pylon side holes 44. Likewise, the pylon mounting system 310 may comprise rear and forward attachments 318,320. The forward attachments may likewise comprise forward wing-mounted fittings 372, 374,376 substantially identical to the forward wing-mounted fittings 72,74,76 of the first embodiment of the invention, having wing-mounting flanges 384 with side attachment holes 386 formed therethrough. The attachment of the first and second forward wing-mounted fittings 372,374 may also be located between upper and lower spars 326,328 of the pylon 312. However, the wing-mounting flanges 384 may have a different shape and configuration than the wing-mounting flanges 84 of the first embodiment of the invention, as best illustrated in FIG. 8.

Furthermore, in the third embodiment of the invention, the mechanical attachment components 77,79 may be replaced with mechanical attachment components 377,379 which are integrally formed with the support bulkhead 340. For example, the mechanical attachment components 377,379 may comprise a boss or a trunnion permanently attached to the pylon 312 and/or integrally formed with its support bulkhead 340. Alternatively, the mechanical attachment components 377,379 may comprise a boss fitting which inserts into cooperating features in the pylon 312 and fastens into place. The boss or trunnion may be configured to be inserted into the side attachment holes 386 of the wing-mounting flanges 384. Specifically, the side attachment holes of the forward wing-mounted fittings may each have a split lug positioned therein or therethrough and configured for receiving the boss or trunnion. The boss or trunnion may be retained by installation of a cap fastened to one of the wing-mounting flanges.

Furthermore, the first and second forward wing-mounted fittings 372,374 may include the addition of drag braces 302 to aid in reacting to thrust loads. The drag braces 302, as illustrated in FIGS. 8 and 9, may have a first end and a second end opposite of the first end. The first end of the drag brace 302 may mechanically attach to the pylon 312 and/or to the first and/or second forward wing-mounted fittings 372,374 at a location proximate to the side attachment holes 386. The second end of the drag brace 302 may be mechanically attached to the wing 314 at a location between the rear and forward attachments 320,322.

Embodiment 4

Figure 10:
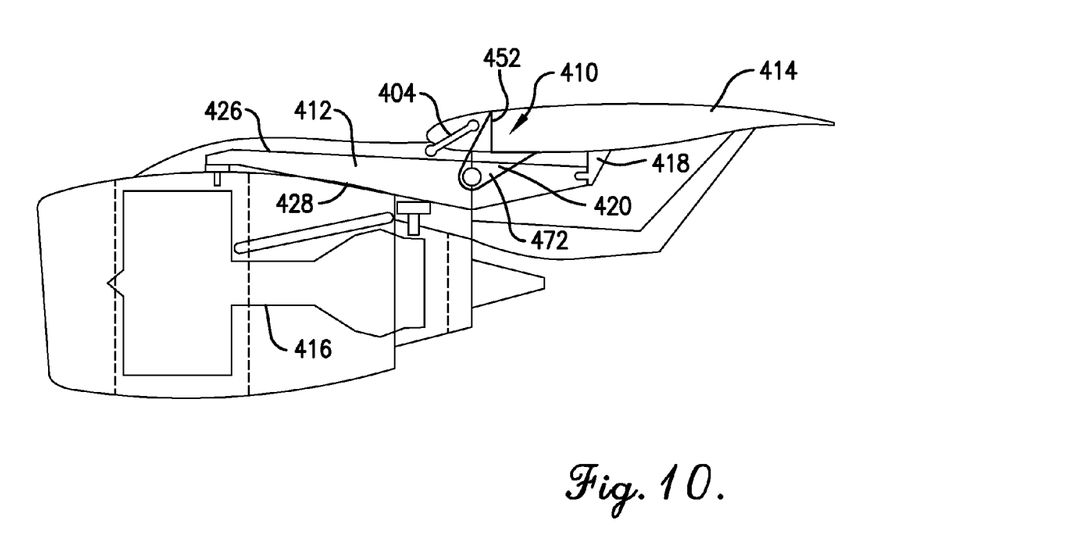
FIG. 10 is a schematic side elevation view of a pylon mounting system constructed according to a fourth embodiment of the invention having an upper brace and a rear attachment with a spigot configuration.

In a fourth embodiment of the invention, a method of mounting an engine pylon 412 to a wing 414 of an aircraft may make use of a pylon mounting system 410, as illustrated in FIG. 10. The pylon 412 may support an aircraft engine 416, thereby providing the necessary structural load paths and required positioning between the engine 416 and the wing 414. The pylon mounting system 410 may comprise a rear attachment 418 and a forward attachment 420. The pylon mounting system 410 may include many of the same elements as the pylon mounting system 10 described above in reference to Embodiment 1 in FIGS. 1-4. Specifically, the forward attachment 420 may have identical components and an identical configuration to the forward attachment 20 described above. Alternatively, the forward attachment 420 may be substantially identical to the forward attachment 220 or the forward attachment 320 of the second and third embodiments of the invention, respectively, without departing from the scope of the invention.

However, in the fourth embodiment of the invention, the rear attachment 418 differs from the rear attachment 18 of the first embodiment of the invention in that the rear attachment 418 comprises a spigot and a spherical bearing interface for providing vertical and side load capability while allowing for thermal growth. Furthermore, in the fourth embodiment of the invention, additional stiffness may be added to the pylon 412 by adding an upper brace 404 located on a centerline of the pylon 412 connecting a wing front spar 452 to a pylon upper spar 426. Additionally or alternatively, dual upper braces (not shown) may be used, each located on either side of the pylon centerline near first and second opposing sides of the pylon 412. Specifically, the dual upper braces may be attached to separate fittings attached to the wing 414 or to attachments incorporated into first and second forward wing-mounted fittings 472,474. The forward wing-mounted fittings 472,474 may have the same components and the same configuration as the first and second forward wing-mounted fittings 72,74 described above in the first embodiment of the invention.

Embodiment 5

Figure 11:
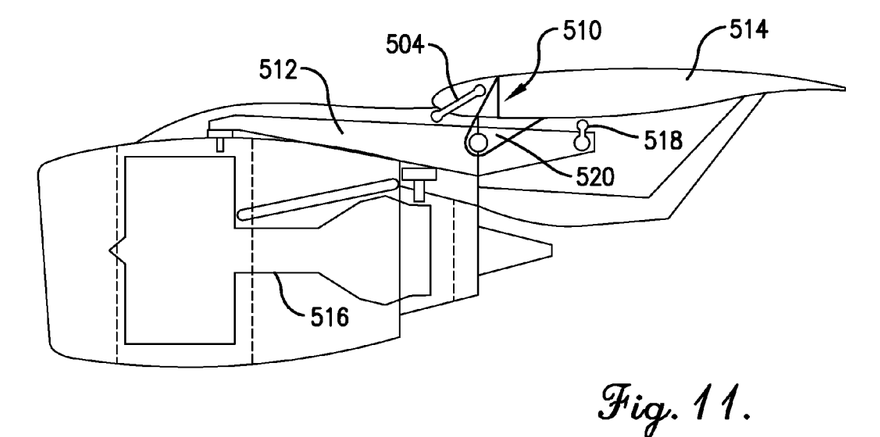
FIG. 11 is a schematic side elevation view of a pylon mounting system constructed according to a fifth embodiment of the invention having a rear attachment with a fore/aft orientated elongated race or slot in which a spherical bearing engaging a spigot is free to slide.

In a fifth embodiment of the invention, a method of mounting an engine pylon 512 to a wing 514 of an aircraft may make use of a pylon mounting system 510, as illustrated in FIG. 11. The pylon 512 may support an aircraft engine 516, thereby providing the necessary structural load paths and required positioning between the engine 516 and the wing 514. The pylon mounting system 510 may comprise a rear attachment 518 and a forward attachment 520. The pylon mounting system 510 may include many of the same elements as the pylon mounting system 10 described above in reference to Embodiment 1 in FIGS. 1-4. Specifically, the forward attachment 520 may have identical components and an identical configuration to any embodiment of the forward attachment 20,220, 320 described above without departing from the scope of the invention.

However, in the fifth embodiment of the invention, the rear attachment 518 may comprise a link or links configured to provide only vertical reaction of loads, as illustrated in FIG. 11. Specifically, the link or links may be attached to a rear wing-mounted fitting at one end and attached to first and/or second sides of the pylon 512 at another end via a pin/boss/ trunnion interface on the pylon 512. An interface between the link or links and the pylon may allow thermal growth of the pylon. Furthermore, the rear attachment 518 may additionally or alternatively comprise a wing-mounted spigot or pin to provide side load reaction capability. At the rear attachment, thermal growth may be accommodated by means of a fore/aft orientated elongated race or slot in which a spherical bearing engaging the spigot is free to slide. Additionally or alternatively, this slotted race ball spigot joint may be used forward, between the first and second wing-mounted fittings, as a lateral restraint replacing the center wing-mounted fitting previously described above.

Furthermore, the pylon mounting system 510 may further include upper braces 504 which join the pylon 512 with the wing 514 and are substantially identical to the upper braces 404 of the fourth embodiment of the invention, as described above. The upper brace or upper braces 504 may be used to provide additional pylon installation stiffness and to provide an alternate or failsafe load path should the rear attachment 518 fail.

Embodiment 6

Figure 12:
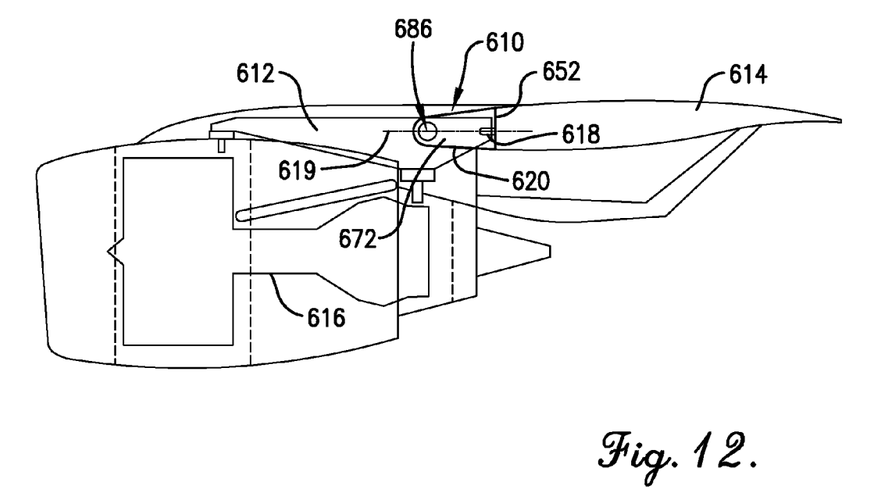
FIG. 12 is a schematic side elevation view of a pylon mounting system constructed according to a sixth embodiment of the invention having a single forward attachment instead of a separate forward and rear attachment between the pylon and the wing.
Figure 13:
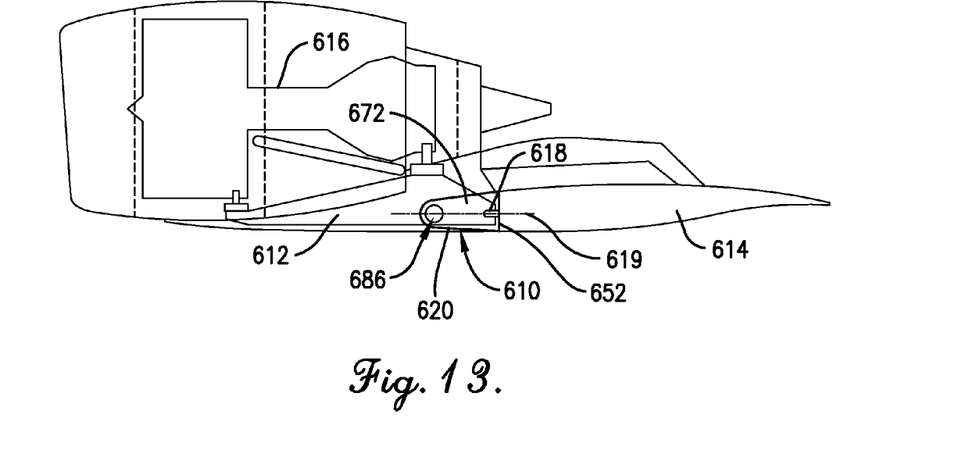
FIG. 13 is a schematic side elevation view of the pylon mounting system of FIG. 12 used for attaching an above-wing propulsion system to the wing.

In a sixth embodiment of the invention, a method of mounting an engine pylon 612 to a wing 614 of an aircraft may make use of a pylon mounting system 610 as illustrated in FIGS. 12 and 13. The pylon 612 may support an aircraft engine 616, thereby providing the necessary structural load paths and required positioning between the engine 616 and the wing 614. The pylon mounting system 610 may include many of the same elements as the pylon mounting system 10 described above in reference to Embodiment 1 in FIGS. 1-4. For example, the pylon mounting system 610 may comprise a forward attachment 620 which is configured to attach to the pylon 612 at a location between upper and lower spars of the pylon 612. The forward attachment 620 may comprise first and second forward wing-mounted fittings 672 similar to the first and second forward wing-mounted fittings 72,74 of the first embodiment of the invention.

However, in the sixth embodiment of the invention, the first and second forward wing-mounted fittings 672 may extend in a generally forward direction relative to a wing front spar 652 of the wing 614, as opposed to extending below the wing, as in the first embodiment of the invention. Furthermore, a rear attachment 618 may be incorporated into the wing front spar 652. For example, the rear attachment 618 may be a pin or spigot attached to the wing 614 or the wing front spar 652 may attach to a spherical bearing in a fitting attached to a rear end of the pylon 612. The axis 619 of the pin may be aligned with a center of side attachment holes 686 of the first and second forward wing-mounted fittings 672 to reduce out-of-plane forces during pylon flexure or beam bending. This sixth embodiment of the invention is illustrated in a below-wing propulsion installation in FIG. 12 and is also illustrated in an above-wing propulsion installation in FIG. 13.

In other alternative embodiments of the invention where the wing is located forward of the engine, the structure of the sixth embodiment of the invention may be reversed, end for end (not shown). For example, the pin or spigot attaching the wing to the wing-mounted fittings may be located forward of the side attachment points of the wing-mounted fittings to the pylon.

Embodiment 7

Figure 14:
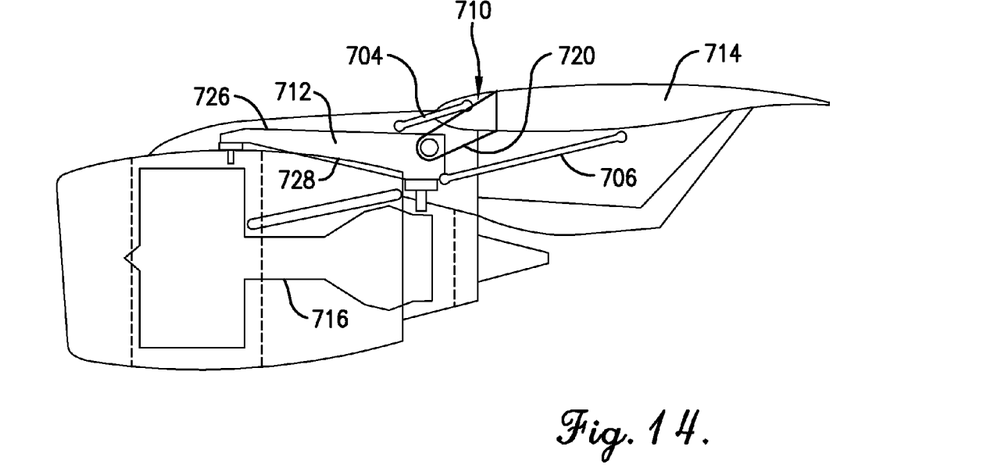
FIG. 14 is a schematic side elevation view of a pylon mounting system constructed according to a seventh embodiment of the invention having a forward attachment, upper braces, and drag braces, but omitting the rear attachment of previous embodiments.

In a seventh embodiment of the invention, a method of mounting an engine pylon 712 to a wing 714 of an aircraft may make use of a pylon mounting system 710, as illustrated in FIG. 14. The pylon 712 may support an aircraft engine 716, thereby providing the necessary structural load paths and required positioning between the engine 716 and the wing 714. The pylon mounting system 710 may include many of the same elements as the pylon mounting system 10 described above in reference to Embodiment 1 in FIGS. 1-4. For example, the pylon mounting system 710 may comprise a forward attachment 720 which is configured to attach to the pylon 712 at a location between upper and lower spars 726, 728 of the pylon 712. However, instead of including a rear attachment, as in the first embodiment of the invention, the seventh embodiment of the invention may use upper and rear braces 704,706 to provide stiffness and load path redundancy, as illustrated in FIG. 14.

Method of Attachment

A method of mounting a pylon to a wing of an aircraft, such as the pylon 12 and the wing 14 illustrated in FIGS. 1-4, may comprise the steps of attaching the first and second forward wing-mounted fittings 72,74 to the wing front spar 52 of the wing 14 and attaching the forward wing-mounted fittings 72,74 to the first and second sides 34,36 of the pylon 12 between the upper and lower spars 26,28 of the pylon 12. The method may further comprise mounting or attaching a rear attachment 18 to another spar of the wing 14 and attaching the rear attachment 18 to a frame component at a rear end of the pylon 12, such as the rear pylon attachment plate 48.

Figure 15:
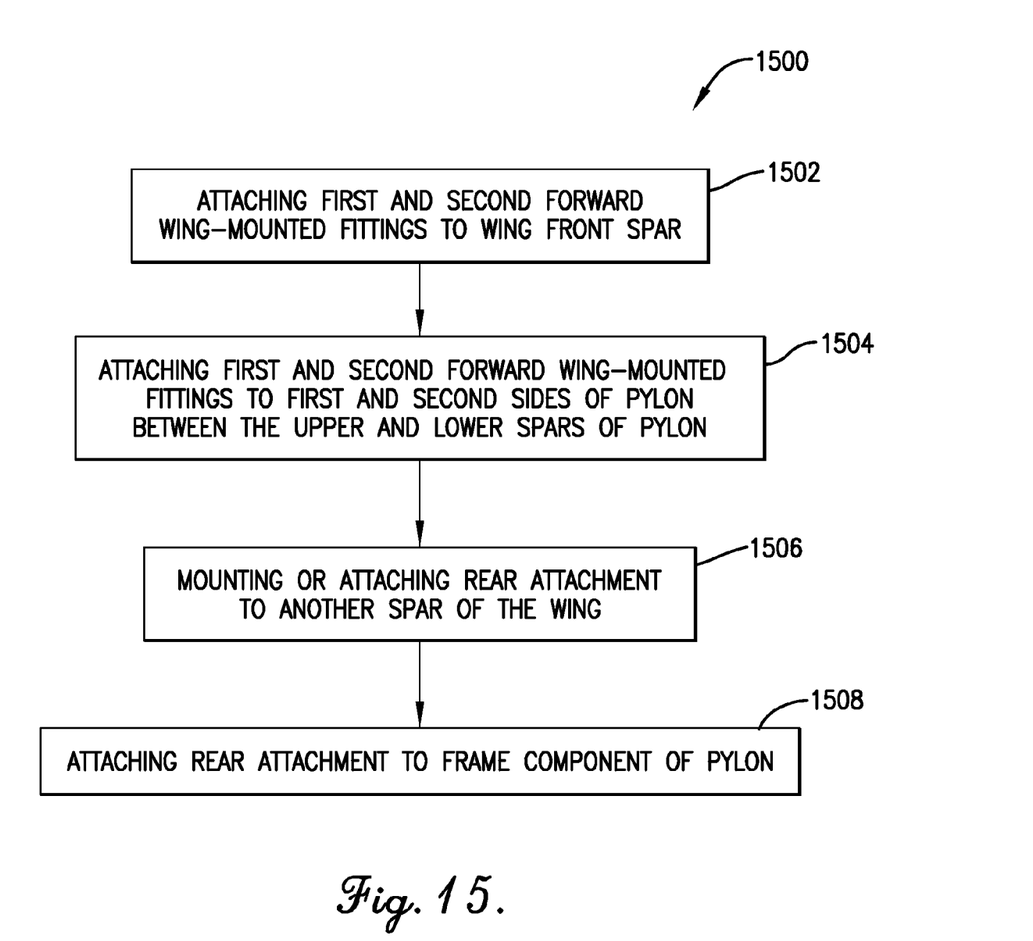
FIG. 15 is a flow chart illustrating a method of mounting a pylon to an aircraft wing in accordance with an embodiment of the present invention.

The flow chart of FIG. 15 depicts the steps of an exemplary method 1500 for mounting a pylon to a wing of an aircraft. In some alternative implementations, the functions noted in the various blocks may occur out of the order depicted in FIG. 15. For example, two blocks shown in succession in FIG. 15 may in fact be executed substantially concurrently, or the blocks may sometimes be executed in the reverse order depending upon the functionality involved. Furthermore, while the method steps below reference the pylon mounting system 10 of the first embodiment of the invention, as illustrated in FIGS. 1-4, at least some of the method steps may be applied to the other embodiments of the pylon mounting system described herein without departing from the scope of the invention.

The method 1500, illustrated in FIG. 15, may first include the step of attaching the forward wing-mounted fittings 72,74 to the wing front spar 52, as depicted in block 1502, and attaching the forward wing-mounted fittings 72,74 to the first and second sides 34,36 of the pylon 12 between the upper and lower spars 26,28 of the pylon 12, as depicted in block 1504. Specifically, step 1502 may include mechanically attaching the wing-mounting flanges 82 to the wing front spar 52 and/or integrally forming the wing-mounting flanges 82 with the wing front spar 52. Step 1504 may include inserting one or more of the mechanical attachment components 77,79 through the side attachment holes 86 of the first and second forward wing-mounted fittings 72,74, as illustrated in FIG. 4, and/or through the bores 42 and/or pylon side holes 44 of the pylon 12 at the first and second sides 34,36 of the pylon 12 between the upper and lower spars 26,28 of the pylon 12. Step 1504 may additionally include attaching the center wing-mounted fitting 76 between the first and second forward wing-mounted fittings 72,74 via the center linking attachment plates 78, as described above and illustrated herein. Step 1504 may include various methods of mechanically linking the various components of the forward attachment 20, as described in any of the example embodiments provided herein, without departing from the scope of the invention.

The method 1500 may further comprise the steps of mounting or attaching the rear attachment 18 to another spar of the wing 14, as depicted in block 1506, and attaching the rear attachment 18 to one of the frame components 24 of the pylon 12, as depicted in block 1508. For example, the rear attachment 18 may be mechanically attached to the rear pylon attachment plate 48. However, step 1508 may include mechanically linking any of the various components of the rear attachment as described in any of the example embodiments provided here without departing from the scope of the invention.

Although the invention has been described with reference to the particular embodiments, it is noted that equivalents may be employed and substitutions made herein without departing from the scope of the invention. For example, the mechanical attachment components 77,79 described above may be replaced with interlocking components fixed to or integrally formed with the forward wing-mounted fittings 72,74 and configured to extend through the pylon 12 between the upper and lower spars 30,32 and to interlock with or attach to each other within the pylon 12.

Having thus described various embodiments of the invention, what is claimed as new and desired to be protected by Letters Patent includes the following:

The invention claimed is:

1. A method of attaching an engine pylon to an aircraft wing, the method comprising:
    attaching a first forward wing-mounted fitting to the pylon at a first side of the pylon between upper and lower spars of the pylon; and
    attaching a second forward wing-mounted fitting to the pylon at a second side of the pylon between the upper and lower spars of the pylon, wherein the second side of the pylon is located opposite of the first side of the pylon.

2. The method of claim 1, further comprising attaching a rear wing-mounted fitting to a rear end of the pylon.

3. The method of claim 1, further comprising a step of attaching the forward wing-mounted fittings to a front spar of the wing.

4. The method of claim 1, further comprising attaching a center wing-mounted fitting located between the first and second forward wing-mounted fittings to the pylon at or proximate to the first and second sides of the pylon via center attachment links such that the center attachment links angle toward each other at ends attached to the center wing-mounted fitting.

5. The method of claim 1, further comprising attaching at least one brace to the pylon and the wing, providing an alternate failsafe load path should any of the wing-mounted fittings fail.

6. The method of claim 1, further comprising aligning side attachment holes formed in the first and second forward wing-mounted fittings with pylon side holes formed through the first and second sides of the pylon and inserting mechanical attachment devices through the side attachment holes of the first and second forward wing-mounted fittings and the pylon side holes.

7. The method of claim 6, wherein the mechanical attachment devices include at least one of a pin, bolt, disk, puck, lug fitting, boss, trunnion, support beam, and cap.

8. The method of claim 6, wherein the mechanical attachment devices are formed of steel and the forward wing-mounted fittings are formed of composite or aluminum material.

9. The method of claim 6, wherein the mechanical attachment devices are substantially cylindrical and have a diameter between 4 inches and 9 inches.

10. The method of claim 6, wherein the diameter of the mechanical attachment devices is between 5 inches and 8 inches.

11. The method of claim 2, further comprising inserting a failsafe catcher pin of the rear wing-mounted fitting into a failsafe catcher hole formed in a rear linking attachment plate, wherein the rear linking attachment plate has a plurality of attachment holes formed therethrough and configured to align with at least one attachment hole formed into the rear wing-mounted fitting when the failsafe catcher pin is inserted in the failsafe catcher hole.

12. The method of claim 11, further comprising inserting a mechanical attachment device through the aligned attachment holes of the rear linking attachment plate and the rear wing-mounted fitting and inserting mechanical attachment devices through aligned attachment holes of the rear linking attachment plate and attachment holes formed into a structural component of the pylon at a rear end of the pylon.

13. A method of attaching an engine pylon to an aircraft wing, the method comprising:
inserting at least one first mechanical attachment device through attachment holes of a first forward wing-mounted fitting and through a first pylon side hole formed through a first side of the pylon between upper and lower spars of the pylon, wherein the first forward wing-mounted fitting is attachable to or integrally formed with a front spar of the wing;
inserting the at least one first mechanical attachment device or at least one second mechanical attachment device through attachment holes of a second forward wing-mounted fitting and through a second pylon side hole formed through a second side of the pylon, opposite of the first side, and between the upper and lower spars of the pylon, wherein the second forward wing-mounted fitting is attachable to or integrally formed with a front spar of the wing; and
attaching a rear wing-mounted fitting to a rear end of the pylon.

14. The method of claim 13, further comprising attaching a center wing-mounted fitting located between the first and second forward wing-mounted fittings to the pylon at or proximate to the first and second sides of the pylon by way of center attachment links angled toward each other at ends attached to the center wing-mounted fitting.

15. The method of claim 13, further comprising engaging at least one of the first mechanical attachment device and the second mechanical attachment devices with a support bulkhead of the pylon positioned between the first and second forward wing-mounted fittings.

16. The method of claim 13, wherein at least one of the first and second mechanical attachment devices includes at least one of a pin, bolt, disk, puck, lug fitting, boss, trunnion, support beam, and cap.

17. The method of claim 13, wherein the mechanical attachment devices are formed of steel and the forward wing-mounted fittings are formed of composite or aluminum material.

18. The method of claim 13, wherein the mechanical attachment devices are substantially cylindrical and have a diameter between 4 inches and 9 inches.

19. The method of claim 13, further comprising inserting a failsafe catcher pin protruding from the rear wing-mounted fitting into a failsafe catcher hole formed through a rear linking attachment plate, wherein attachment holes formed through the rear linking attachment plate are configured to align with at least one attachment hole formed into the rear wing-mounted fitting when the failsafe catcher pin is inserted in the failsafe catcher hole.

20. A method of attaching an engine pylon to an aircraft wing, the method comprising:
inserting at least one first mechanical attachment device through a side attachment hole of a first forward wing-mounted fitting, through a first pylon side hole formed through a first side of the pylon between upper and lower spars of the pylon, and through a first bore formed into a support bulkhead of the pylon, wherein the first forward wing-mounted fitting is attached to or integrally formed with a front spar of the wing, wherein the first side attachment hole, the first pylon side hole, and the first bore are axially aligned along an axis extending through a width of the pylon;
inserting the at least one first mechanical attachment device or at least one second mechanical attachment device through a second attachment hole of a second forward wing-mounted fitting, through a second pylon side hole formed through a second side of the pylon, opposite of the first side, and between the upper and lower spars of the pylon, and through a second bore formed into a support bulkhead of the pylon, wherein the second forward wing-mounted fitting is attached to or integrally formed with a front spar of the wing, wherein the second side attachment hole, the second pylon side hole, and the second bore are axially aligned with the axis extending through the width of the pylon;
attaching a center wing-mounted fitting located between the first and second forward wing-mounted fittings to the pylon at or proximate to the first and second sides of the pylon by way of center attachment links;
inserting a failsafe catcher pin integrally formed with and protruding from a rear wing-mounted fitting attached to the wing into a failsafe catcher hole formed through a rear linking attachment plate fixed at an end of the pylon; and
mechanically fastening the rear wing-mounted fitting with the rear linking attachment plate by inserting mechanical fasteners through attachment holes formed through the rear linking attachment plate that align with at least one attachment hole formed into the rear wing-mounted fitting when the failsafe catcher pin is inserted in the failsafe catcher hole.

* * * * *